United States Patent
Surtani et al.

(10) Patent No.: US 7,761,434 B2
(45) Date of Patent: Jul. 20, 2010

(54) MULTIVERSION CONCURRENCY CONTROL IN IN-MEMORY TREE-BASED DATA STRUCTURES

(75) Inventors: Manik Ram Surtani, London (GB); Jason Thomas Greene, Madison, WI (US)

(73) Assignee: Red Hat, Inc., Raleigh, NC (US)

( * ) Notice: Subject to any disclaimer, the term of this patent is extended or adjusted under 35 U.S.C. 154(b) by 415 days.

(21) Appl. No.: 11/986,256

(22) Filed: Nov. 19, 2007

(65) Prior Publication Data

US 2009/0132535 A1  May 21, 2009

(51) Int. Cl.
*G06F 17/30* (2006.01)
(52) U.S. Cl. ...................................... 707/704
(58) Field of Classification Search .................. 707/8, 707/100–102, 201–204; 711/124, 144, 147
See application file for complete search history.

(56) References Cited

U.S. PATENT DOCUMENTS

| | | | |
|---|---|---|---|
| 7,293,028 B2* | 11/2007 | Cha et al. .................. 707/100 |
| 7,360,033 B2* | 4/2008 | Hum et al. ................. 711/141 |
| 7,379,952 B2* | 5/2008 | Chan et al. ................. 707/204 |
| 7,523,260 B2* | 4/2009 | Arimilli et al. .............. 711/124 |
| 7,535,475 B2* | 5/2009 | Sorotokin et al. ........... 345/581 |
| 2008/0034537 A1* | 2/2008 | Tuller .......................... 16/197 |
| 2008/0065644 A1* | 3/2008 | Pasupuleti et al. ........... 707/10 |

OTHER PUBLICATIONS

Ben Wang, JBoss Cache as a POJO Cache, Nov. 9, 2005, pp. 1-13, Published on ONJava.com.

* cited by examiner

*Primary Examiner*—Debbie Le
(74) *Attorney, Agent, or Firm*—Blakely, Sokoloff, Taylor & Zafman LLP (57) ABSTRACT

A method and apparatus for providing concurrent access to a cache node of a tree-based data structure. Readers concurrently read access the cache node. A copy of the cache node is created for a write access of a writer. Only one copy of the cache node is allowed at any one time. The writer operates on the copy of the cache node while concurrent read access of the cache node are provided to the readers.

10 Claims, 10 Drawing Sheets

MULTIVERSION CONCURRENCY CONTROL IN IN-MEMORY TREE-BASED DATA STRUCTURES

TECHNICAL FIELD

Embodiments of the present invention relate to cache, and more specifically to a tree-structured, clustered, transactional cache.

BACKGROUND

Caches are commonly used in computer systems. A cache is a collection of data duplicating original values stored elsewhere or computed earlier, where the original data is expensive to fetch (due to slow access time) or to compute, relative to the cost of reading the cache. In other words, a cache is a temporary storage area where frequently accessed data can be stored for rapid access. Once the data is stored in the cache, future use can be made by accessing the cached copy rather than re-fetching or recomputing the original data, so that the average access time is lower.

Caches have proven to be extremely effective in many areas of computing because access patterns in typical computer applications have locality of reference (temporal and spatial locality). Spatial locality refers to data that might or might not be located physically close to each other. Temporal locality refers to data that are accessed close together in time. However, enabling concurrent access as to the same data provide some challenges to maintain integrity of the data. For example, a reader may be accessing a document at a time when a writer is modifying the document.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for implementing Multi Version Concurrency Control (MVCC) to a memory tree-based data structure. The present implementation of MVCC to cache nodes takes advantage of Java memory semantics. As such, all readers read the node directly. When writing, the node is copied and writes are made to the copy. An exclusive lock is only obtained on the copy. Only one writable copy is maintained per node. Readers are not blocked during writes. Only one writer is allowed. In Repeatable-Read only cases, when writing before tx commits, the writer compares versions with the underlying node. Either an exception is thrown or the node is overwritten depending on the settings.

Multi Version Concurrency Control (MVCC) in Databases

With respect to databases, MVCC is concurrency control method commonly used by database management systems to provide concurrent access to the database. From the perspective of the client, MVCC provides each user connected to the database with a "snapshot" of the database for that person to work with. Any changes made will not be seen by other users of the database until the transaction has been committed or confirmed.

MVCC uses timestamps or increasing transaction IDs to achieve serializability. MCC ensures a transaction never has to wait for a database object by maintaining several versions of an object. Each version would have a write timestamp and it would let a transaction Ti read the most recent version of an object which precedes timestamp TS(Ti).

If Ti wants to write to an object, and if there was another transaction Tj, the timestamp order must be TS(Ti)<TS(Tj) for the object write to succeed.

Every object would also have a read timestamp, and if Ti wanted to write to object P, and TS(Ti)<RTS(P), Ti is aborted and restarted. Otherwise, Ti creates a new version of P and sets the read/write timestamps of P to TS(Ti).

A drawback to this system is the cost of storing multiple versions of objects in the database. On the other hand, reads are never blocked, which can be important for workloads mostly involving reading values from the database. MCC is particularly adept at implementing true snapshot isolation, something which other methods of concurrency control frequently do either incompletely or with high performance cost.

Locking Strategies with JBoss Cache

For illustration purposes, JBoss Cache is a tree-structured, clustered, transactional cache. JBoss Cache offers a simple API where data, such as simple Java objects, can be placed in the cache and, based on configuration options selected, the data may be replicated to some or all cache instances in a cluster. To control concurrent access, JBoss Cache may use a pessimistic and optimistic locking scheme. However, both schemes have certain drawbacks such as in pessimistic locking (poor concurrency (writers block readers), increased potential for deadlocks (TimeoutException), issues when readers upgrade to writers) and in optimistic locking (high memory overhead and low scalability since each reader and writer transaction copies data to a workspace, expensive post-transaction comparison phase, only one isolation mode can be implemented). In summary, too many configuration/tuning options result in a lot of confusion and unnecessary complex code.

Overview of JBoss Cache MVCC

The implementation of MVCC to memory tree-based data cache node structures allows for high concurrency for processes to simultaneously read and write to the same data, while maintaining a high standard of data integrity. The presently described system is optimized for readers as a typical cache since it is very read-heavy. In one embodiment, readers should not have to wait until writers have finished to start reading data from the cache.

Figure 1:
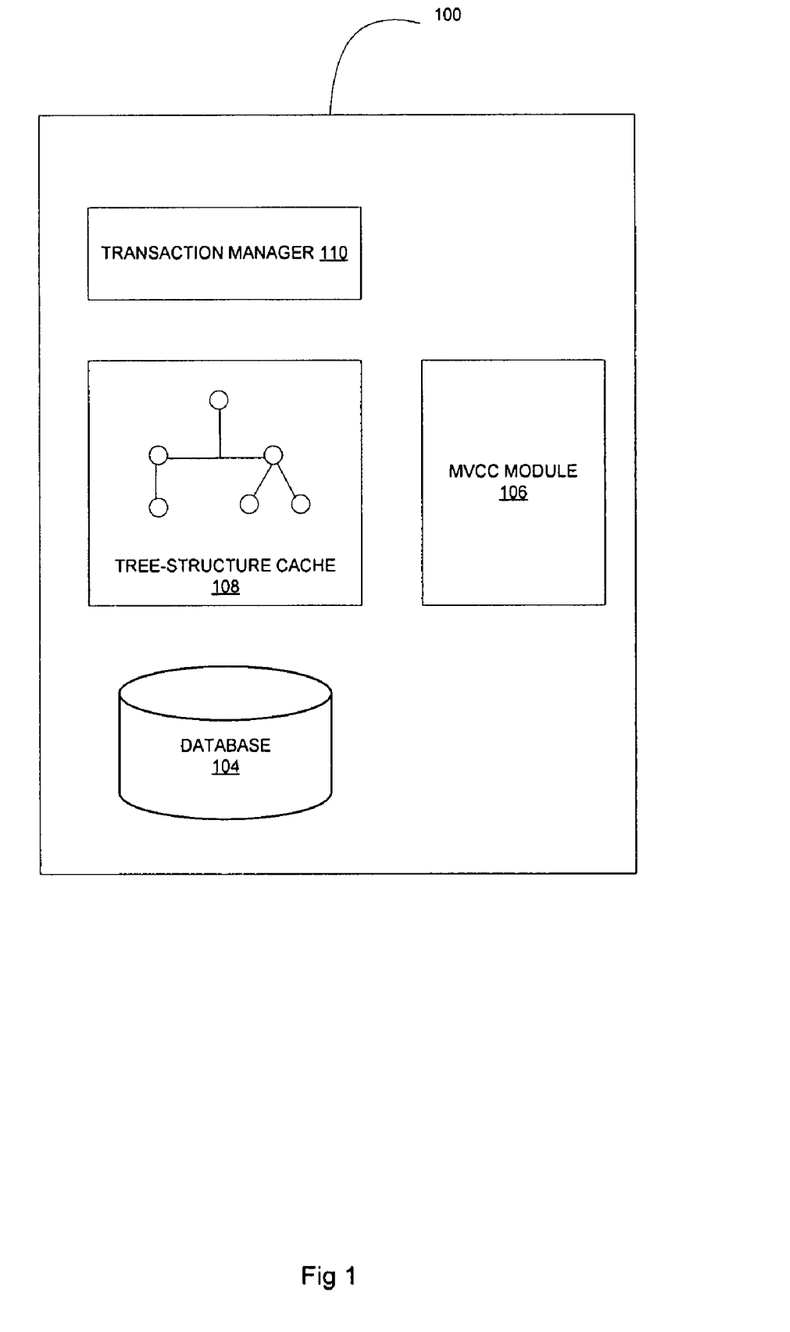
FIG. 1 illustrates a block diagram of one embodiment of an apparatus for implementing Multi Version Concurrency Control (MVCC) to a memory tree-based data structure.

FIG. 1 illustrates a block diagram of one embodiment of an apparatus 100 for implementing Multi Version Concurrency Control (MVCC) to a memory tree-based data structure. Apparatus 100 may include a memory tree-based data structure 102, a database 104, and a MVCC module 106. The tree-based data structure includes a tree-based cache nodes 108. In one embodiment, each cache node may store data retrieved from database 104. The MVCC module 106 allows for concurrent access to data in the tree-based data structure 102. An example of an architecture of the MVCC module 106 is illustrated below with respect to FIG. 2. A user may communicate by reading or writing to the cache via a transaction manager module 110.

In accordance with one embodiment, a concurrent access occurs when the same data is being accessed at about the same time by different sources. For example, a writer may first be accessing the data to modify it. While the writing is accessing the data, a reader may access the same data that the writer is accessing. As such, the access from either writer or reader need not start at the same time.

Figure 2:
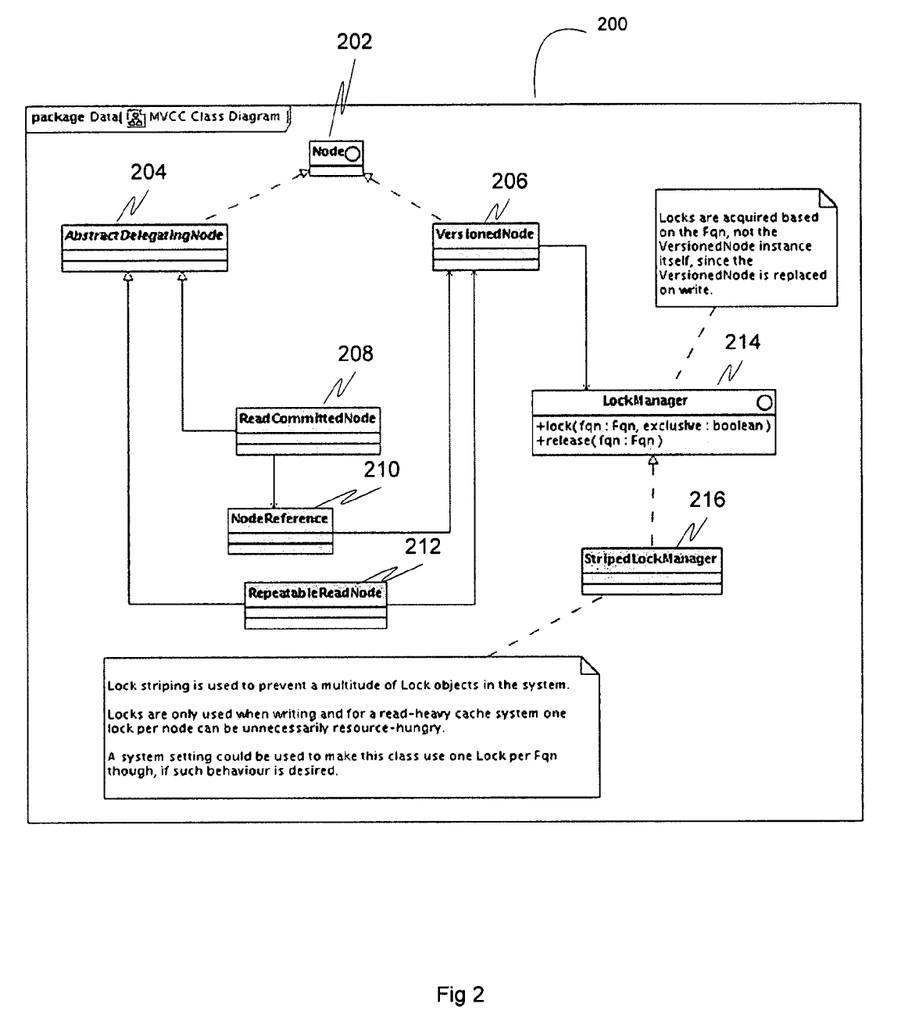
FIG. 2 illustrates a block diagram of one embodiment of a class structure architecture for implementing (MVCC) to a memory tree-based data structure.

FIG. 2 illustrates a block diagram of one embodiment of a class structure architecture 200 for implementing (MVCC) to a memory tree-based data structure. A node 202 from the memory tree-based data structure includes an AbstractDelegatingNode 204 and a VersionedNode 206. AbstractDelegatingNode 204 is a subclass that includes a very lightweight object that just hold a reference (and thus cheap to construct). AbstractDelegatingNode 204 includes the following subclasses: ReadCommittedNode 208 and RepeatableReadNode 212. When a user gets a hold of a Node using Cache.getRoot( ).getChild( ), a new instance of ReadCommittedNode 208 or RepeatableReadNode 212 is returned every time.

ReadCommittedNode 208 is a subclass that holds a reference to a NodeReference 210 which holds a volatile reference to a VersionedNode 206 and delegates calls to it. Repeatable Read Node 212 is a subclass that holds a reference to VersionedNode 206 in the cache and delegates calls to it.

VersionedNode 206 includes a LockManager 214 subclass and a StripedLockManager 216 subclass. Locks are acquired based on the Fqn and not on the VersionedNode 206 instance itself since the VersionedNode 206 is replaced on write. StripedLockManager 216 is used to prevent a multitude of Lock objects in the system. Locks are only used when writing and for a read-heavy cache system. One lock per node can be unnecessarily resource-hungry. A system setting could be used to make this class use one Lock per Fqn if such behavior is desired.

Figure 3A:
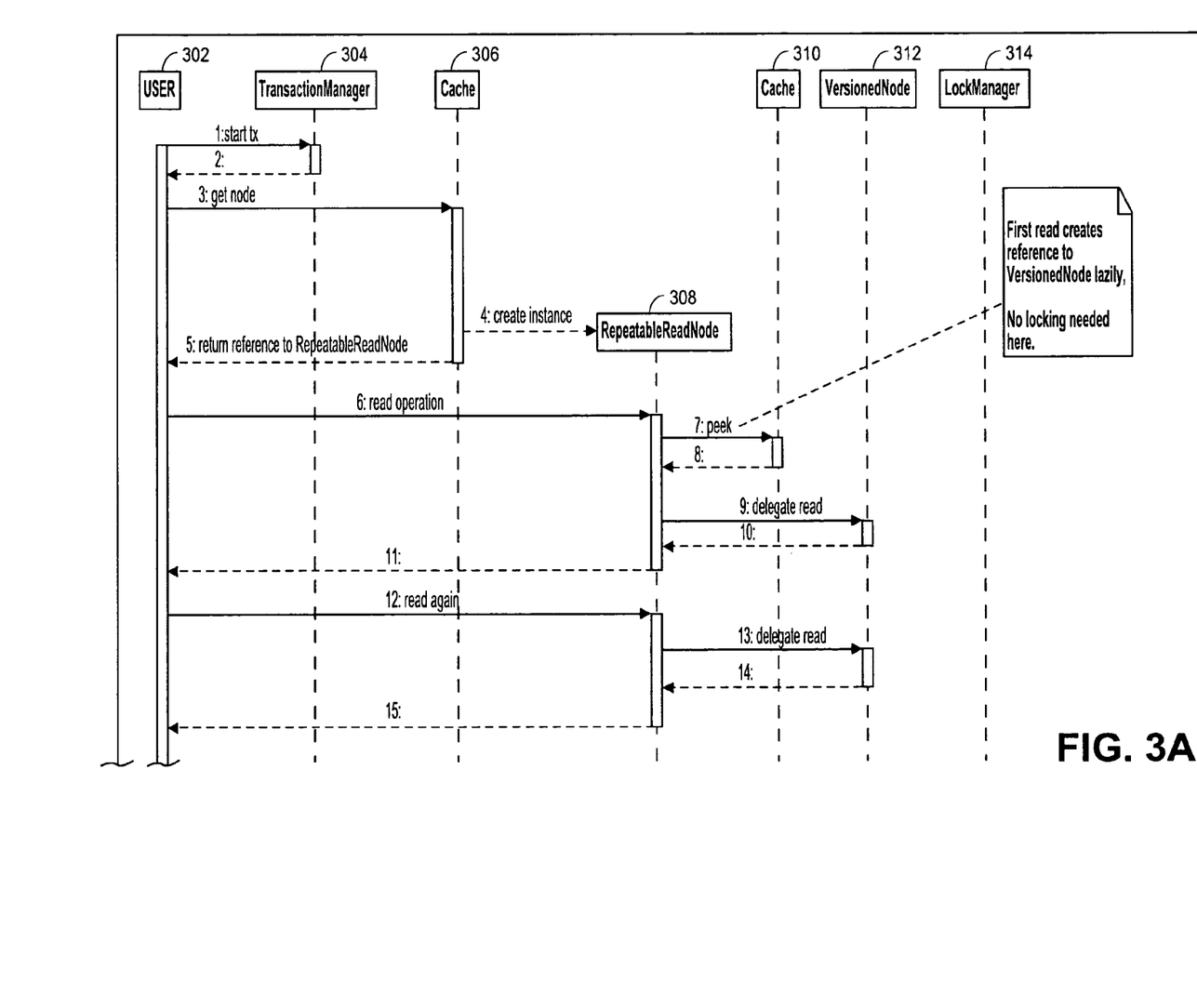
FIGS. 3A, 3B, 3C illustrate a block diagram of one embodiment of a Repeatable Read interaction in accordance with one embodiment.
Figure 3B:
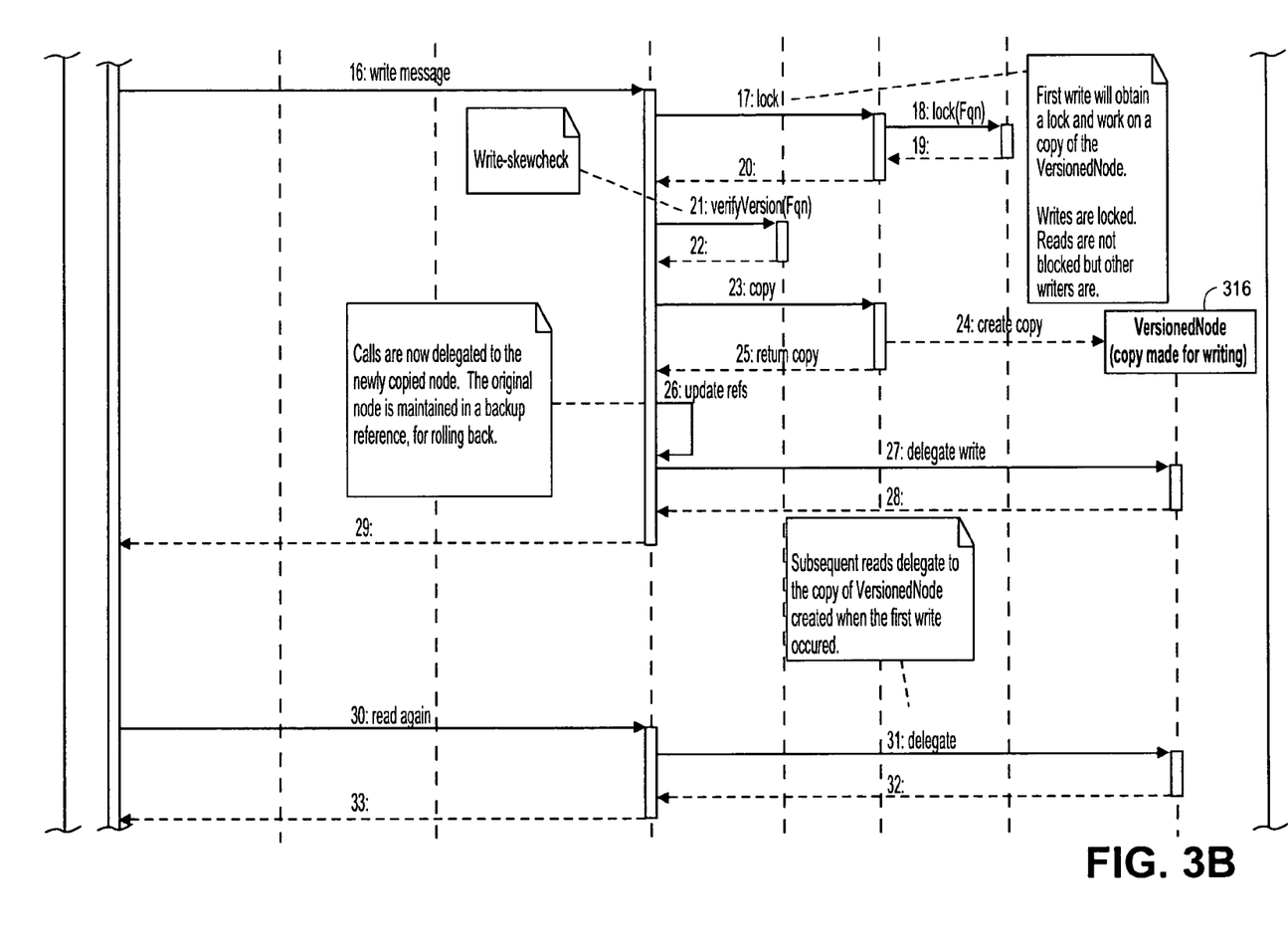
Figure 3C:
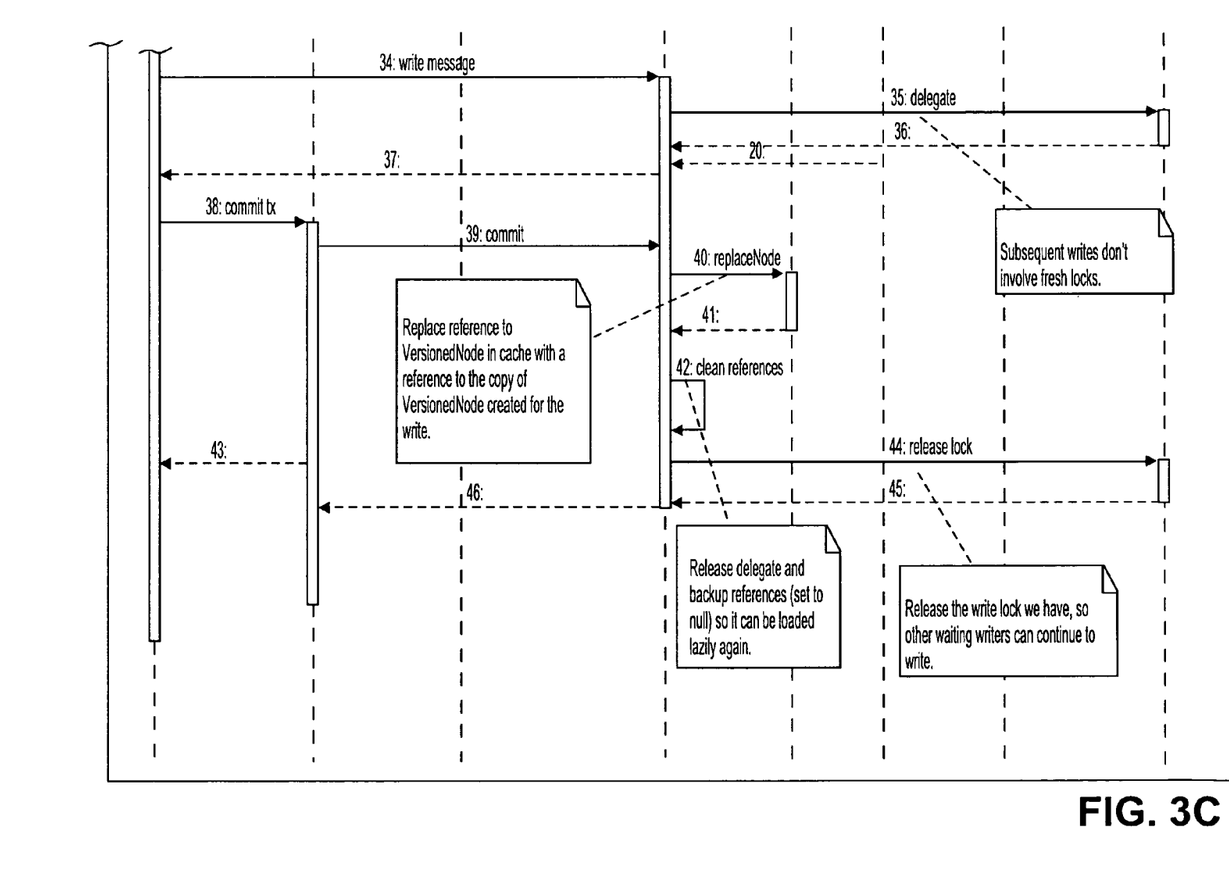

FIGS. 3A-3C illustrate a block diagram of one embodiment of a Repeatable Read call in accordance with one embodiment. A user first initiates a call with TransactionManager 304 and gets a node from cache 306. An instance of the node, Cache 310, is created with RepeatableReadNode 308.

When the user calls a read operation, RepeatableReadNode 308 peeks into Cache 310. The first reads creates reference to VersionedNode 312. No locking is needed here. RepeatableReadNode then delegates the read to VersionedNode 312.

When a read operation is performed again, RepeatableReadNode 308 again delegates the read to VersionedNode 312.

When a write call is performed for the first time, RepeatableReadNode 308 sends a lock request to VersionedNode 312 which locks cache 310 with LockManager 314. The first write operation works on a copy of the VersionedNode. In this case, write functions are locked. Read functions are not blocked. However, other write functions are blocked. Calls are now delegated to a newly copied node (VersionedNode copy 316). The original node (VersionedNode 312) is maintained in a backup reference for rolling back. Subsequent reads delegate to the copy of the VersionedNode316 created when the first write occurred. It should be noted that subsequent writes do not involve new locks.

When TransactionManager 304 receives a commit transmission from the user, RepeatableReadNode 308 replace the reference to VersionedNode 312 in cache 306 with a reference to the copy of the VersionedNode 316 created for the write. Delegation is released and references are backed up (set to null) so that it can be loaded again. Write locks are also released so that other waiting writers can continue to write.

Repeatable read is achieved since readers all still point to their version of VersionedNode 312 (reference still held by other RepeatableReadNode 308 instances) while writer works with a copy of VersionedNode 314.

Figure 4A:
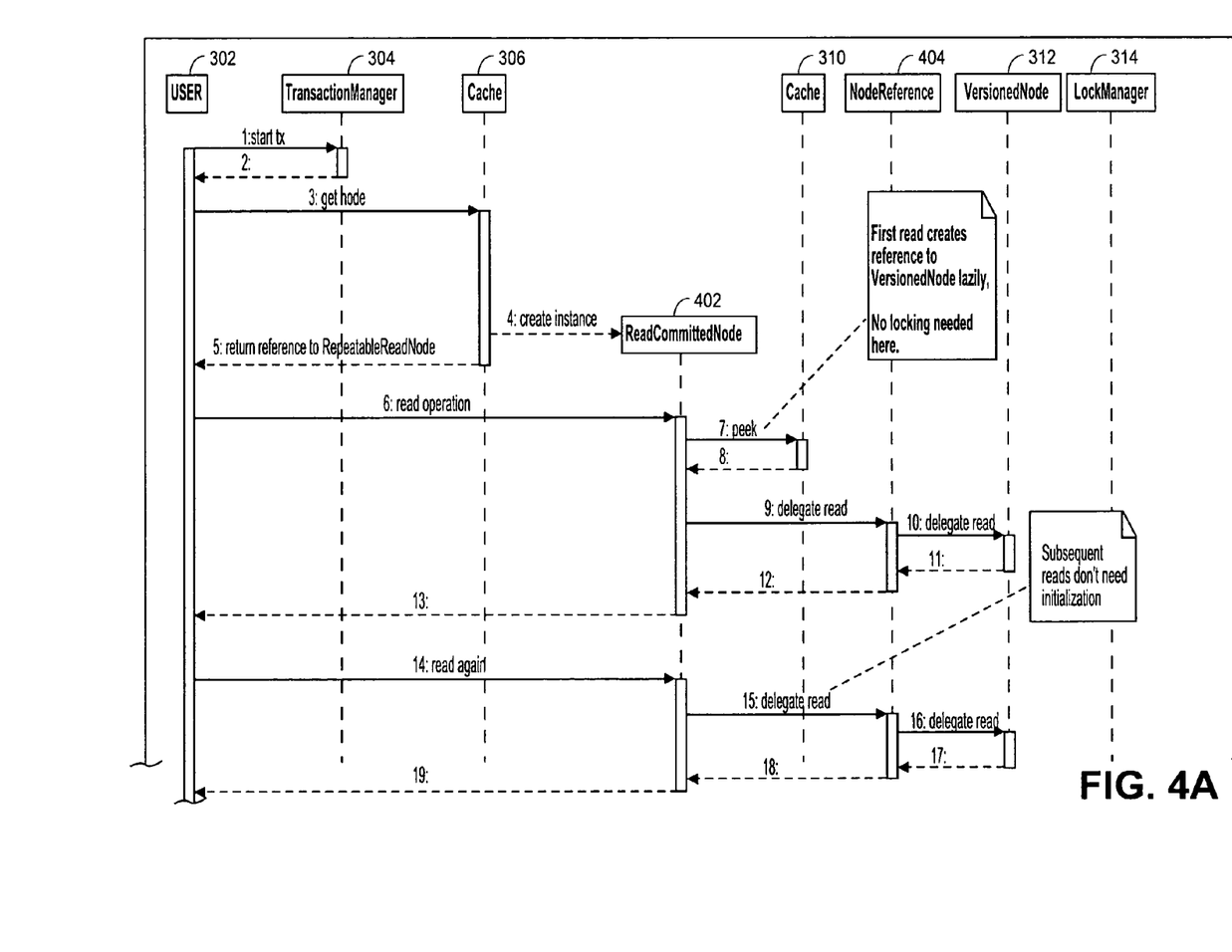
FIGS. 4A, 4B, 4C illustrate a block diagram of one embodiment of a Read Committed interaction in accordance with one embodiment.
Figure 4B:
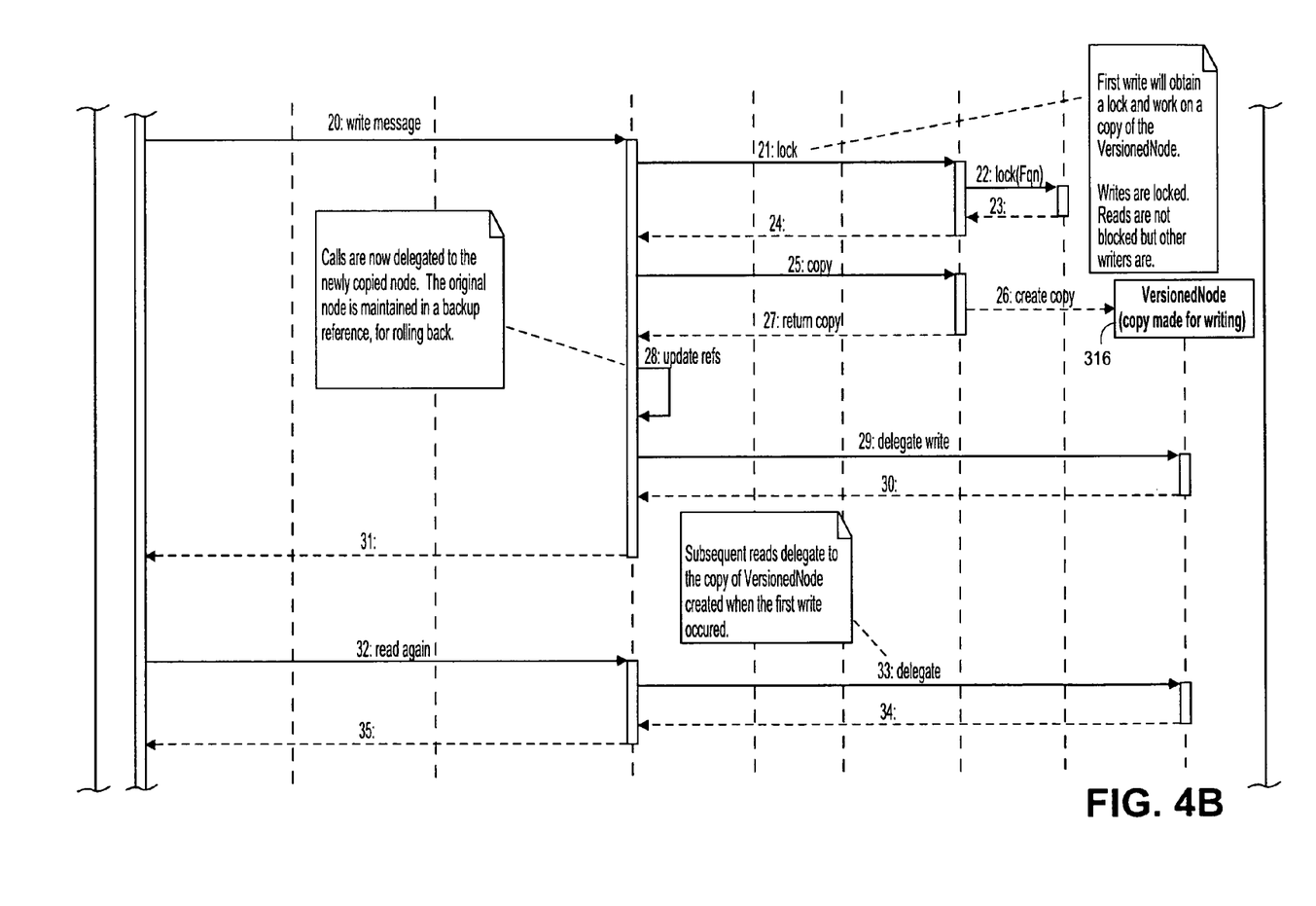
Figure 4C:
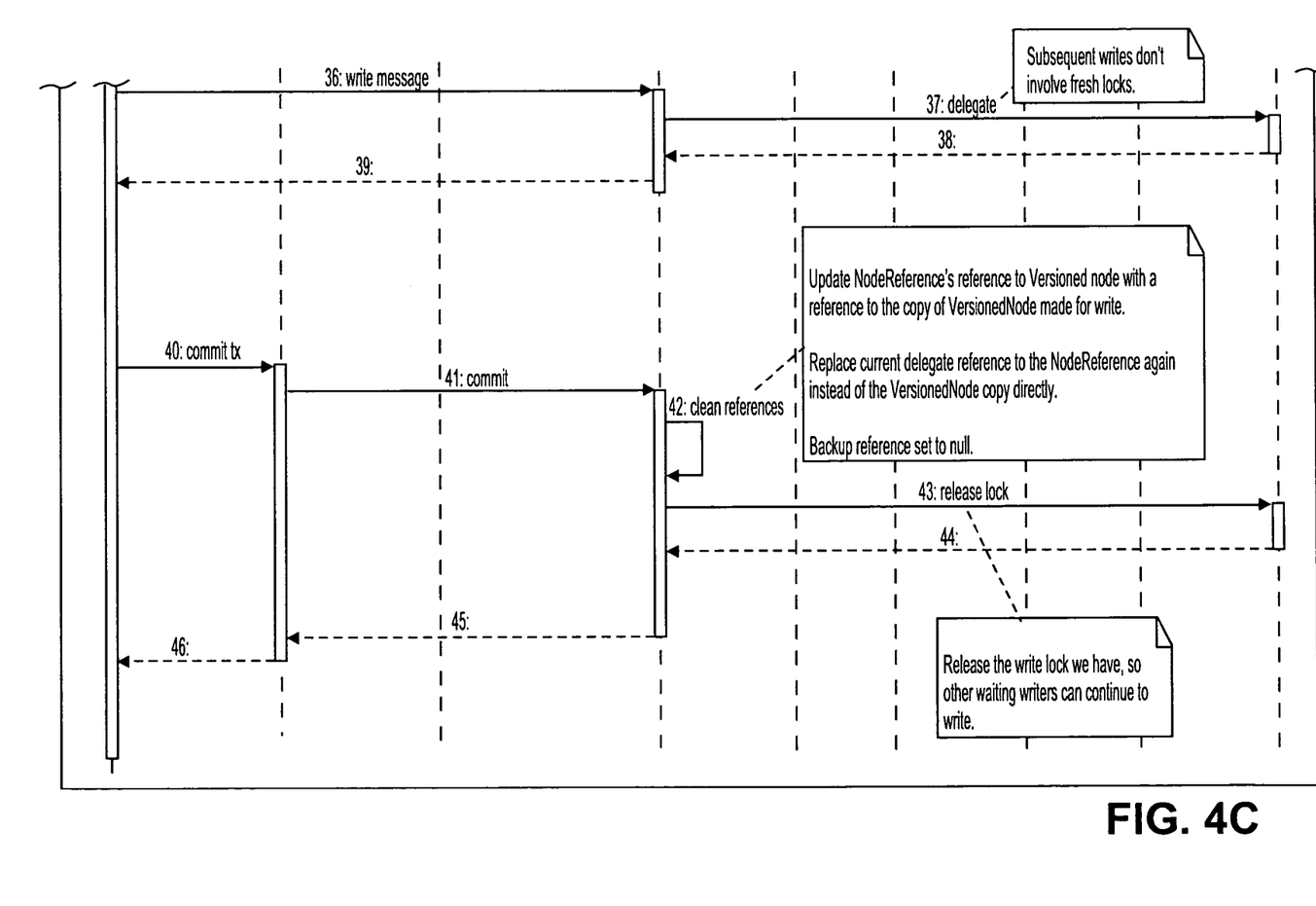

FIGS. 4A-4C illustrate a block diagram of one embodiment of a Read Committed call in accordance with one embodiment. A user first initiates a call with TransactionManager 304 and gets a node from cache 306. An instance of the node, Cache 310, is created with ReadCommittedNode 402.

When the user calls a read operation, ReadCommittedNode 402 accesses Cache 310. The first read is initialized by creating a reference to NodeReference 404. No locking is needed here. ReadCommittedNode 402 then delegates the read to NodeReference 404 which delegates to VersionedNode 312.

When a read operation is performed again, ReadCommittedNode 402 again delegates the read to VersionedNode 312.

When a write call is performed for the first time, ReadCommittedNode 402 sends a lock request to VersionedNode 312 which locks cache 310 with LockManager 314. The first write operation works on a copy of the VersionedNode. In this case, write functions are locked. Read functions are not blocked. However, other write functions are blocked. Calls are now delegated to a newly copied node (VersionedNode copy 316). The original node (VersionedNode 312) is maintained in a backup reference for rolling back. Subsequent reads delegate to the VersionedNode copy 316 created when the first write occurred. In one embodiment, subsequent writes do not involve new locks.

When TransactionManager 304 receives a commit transmission from the user, ReadCommittedNode 402 cleans references and release the lock. Delegation is released and references are backed up (set to null) so that it can be loaded again. Write locks are also released so that other waiting writers can continue to write.

Repeatable read is achieved since readers all still point to their version of VersionedNode 312 (reference still held by other RepeatableReadNode 308 instances) while writer works with a copy of VersionedNode 314.

As such, readers and writers work delegation to a VersionedNode 312 via NodeReference 404. NodeReference 404 is updated when a writer commits. Then, everyone sees this commit.

Computer System

Figure 5:
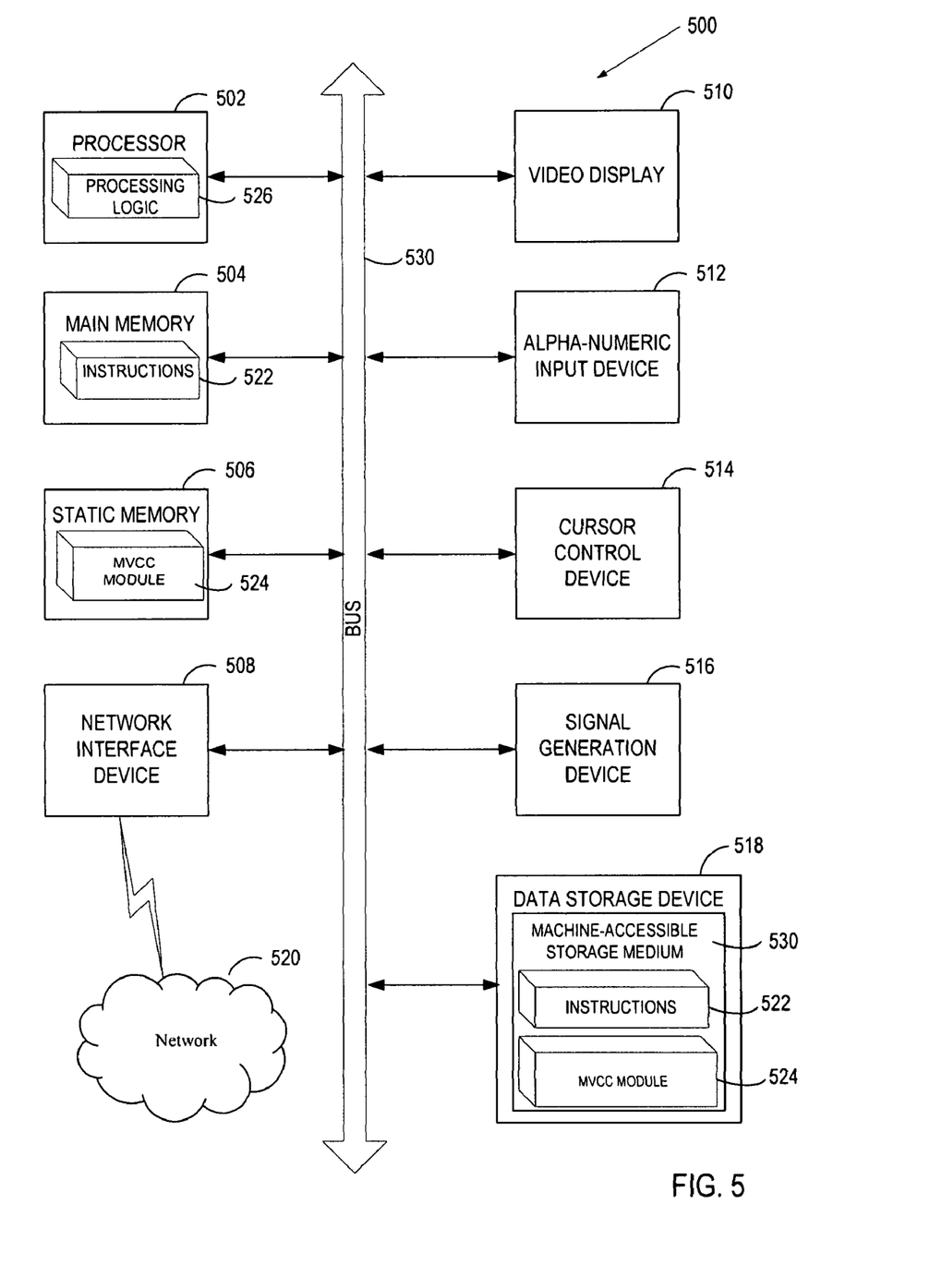
FIG. 5 illustrates a block diagram of an exemplary computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

The machine-accessible storage medium 530 may also be used to store MVCC module 524. MVCC module 524 may also be stored in other sections of computer system 500, such as static memory 506.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Figure 6:
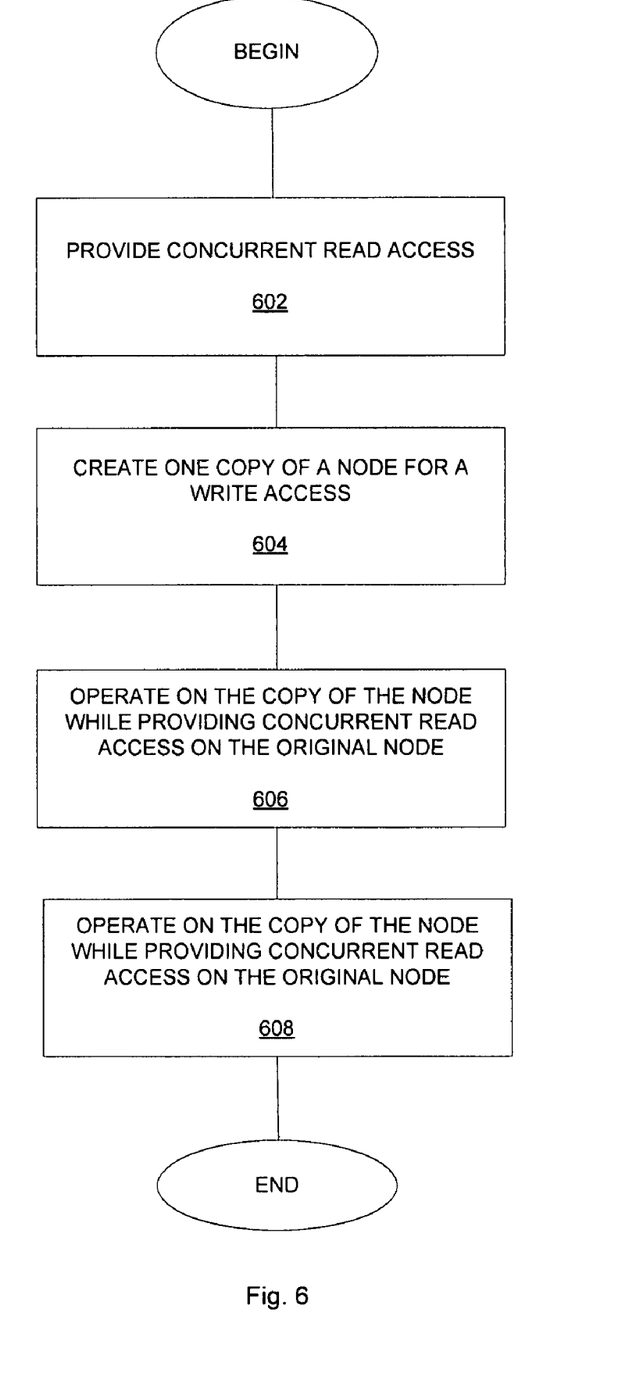
FIG. 6 illustrates a flow diagram of one embodiment of a method for implementing MVCC to a memory tree-based data structure.

FIG. 6 illustrates a flow diagram of one embodiment of a method for implementing MVCC to a memory tree-based data structure. At 602, one or more readers concurrently have read access to the cache node. At 604, a copy of the cache node is created for a write access of a writer. It should be noted that only one copy of the cache node is allowed at any one time. At 606, the write operates on the copy of the cache node while concurrent read access of the cache node is provided to the one or more readers. At 608, when the writer commits, the original cache node is replaced with the copy of the cache node that the write operated on.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

Thus, a method and apparatus for replicating cache nodes in a tree-structure cache cluster have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An apparatus for providing concurrent access to a tree-based data structure, comprising:
   a memory comprising the tree-based data structure having cache nodes, the memory coupled to a storage device comprising a database; and
   a concurrency control module coupled to the memory,
   wherein the concurrency control module is configured to provide concurrent read access to a node of the cache to one or more readers in response to a read call from the one or more readers, to create a copy of the node for a write access of a writer in response to a write call from the writer, only one copy of the node being allowed at one time, to lock the node in response to a creation of the copy of the node for the write access, wherein the lock prevents another writer from creating another copy of the node, to release the lock on the node in response to receiving a commit call from the writer, to operate on the copy of the node while providing concurrent read access of the node to one or more readers, to replace the node with the copy of the node in response to receiving the commit call from the writer, and to provide concurrent read access to the replaced node to the one or more readers.

2. The apparatus of claim 1 further comprising:
   a transmission manager module coupled to the cache, the transmission manager module configured to receive a communication from one or more readers and at least one writer.

3. The apparatus of claim 1 wherein the concurrency control module is configured to replace the node with the copy of the node in response to the writer confirming a modification of the copy of the cache node.

4. The apparatus of claim 1 wherein the concurrency control module is configured to provide concurrent read access to the replaced node to the one or more readers.

5. The apparatus of claim 1 wherein the one or more readers directly read the cache node.

6. A computer-readable storage medium, having instructions stored therein, which when executed, cause a computer system to perform a method comprising:
   providing concurrent read access to the cache node to one or more readers in response to a read call from the one or more readers;
   creating a copy of the cache node for a write access of a writer in response to a write call from the writer, only one copy of the cache node being allowed at any one time;
   locking the cache node in response to creating the copy of the cache node for the write access, wherein locking prevents another writer from creating another copy of the cache node;
   releasing the locking on the cache node in response to receiving a commit call from the writer;
   operating on the copy of the cache node while providing concurrent read access of the cache node to one or more readers;
   replacing the cache node with the copy of the cache node in response to receiving the commit call from the writer; and
   providing concurrent read access to the replaced cache node to the one or more readers.

7. The computer-readable storage medium of claim 6 wherein the method further comprises:
   replacing the cache node with the copy of the cache node in response to the writer confirming a modification of the copy of the cache node.

8. The computer-readable storage medium of claim 6 wherein the method further comprises:
   providing concurrent read access to the replaced cache node to the one or more readers.

9. The computer-readable storage medium of claim 6 wherein the one or more readers directly read the cache node.

10. A computer-implemented method for providing concurrent access to a cache node of a tree-based data structure, the method comprising:
    providing concurrent read access to the cache node to one or more readers in response to a read call from the one or more readers;
    creating a copy of the cache node for a write access of a writer in response to a write call from the writer, only one copy of the cache node being allowed at any one time;
    locking the cache node in response to creating the copy of the cache node for the write access, wherein locking prevents another writer from creating another copy of the cache node;
    releasing the locking on the cache node in response to receiving a commit call from the writer;
    operating on the copy of the cache node while providing concurrent read access of the cache node to one or more readers;
    replacing the cache node with the copy of the cache node in response to receiving the commit call from the writer; and
    providing concurrent read access to the replaced cache node to the one or more readers.

* * * * *